US009139429B2

(12) United States Patent
Huang (10) Patent No.: US 9,139,429 B2
(45) Date of Patent: Sep. 22, 2015

(54) HIGH PERFORMANCE CATHODE MATERIAL LIFEPO4, ITS PRECURSORS AND METHODS OF MAKING THEREOF

(76) Inventor: Guiqing Huang, Newton, MA (US)

(*) Notice: Subject to any disclaimer, the term of this patent is extended or adjusted under 35 U.S.C. 154(b) by 612 days.

(21) Appl. No.: 13/036,566

(22) Filed: Feb. 28, 2011

(65) Prior Publication Data

US 2012/0058039 A1 Mar. 8, 2012

Related U.S. Application Data

(60) Provisional application No. 61/309,472, filed on Mar. 2, 2010.

(51) Int. Cl.
*C01B 25/45* (2006.01)
*B82Y 30/00* (2011.01)
*B82Y 40/00* (2011.01)
*C01B 25/37* (2006.01)
*H01M 4/58* (2010.01)

(52) U.S. Cl.
CPC .............. *B82Y 30/00* (2013.01); *C01B 25/375* (2013.01); *C01B 25/45* (2013.01); *H01M 4/5825* (2013.01)

(58) Field of Classification Search
CPC ... H01M 4/5825; B82Y 30/00; C01B 25/375; C01B 25/45
USPC .......................................... 423/306; 977/948
See application file for complete search history.

(56) References Cited

U.S. PATENT DOCUMENTS

| 7,282,301 | B2* | 10/2007 | Wixom et al. | 429/231.95 |
| 2002/0061274 | A1* | 5/2002 | Hosoya et al. | 423/306 |
| 2010/0102270 | A1* | 4/2010 | Jia et al. | 252/182.1 |
| 2011/0300292 | A1* | 12/2011 | Yang et al. | 427/126.1 |
| 2012/0015249 | A1* | 1/2012 | Awano et al. | 429/221 |

FOREIGN PATENT DOCUMENTS

CN 101337666 A * 1/2009 .............. C01B 25/45

OTHER PUBLICATIONS

Machine translation of CN101337666A.*

* cited by examiner

*Primary Examiner* — Jun Li
(74) *Attorney, Agent, or Firm* — Locke Lord LLP; Tim Tingkang Xia, Esq.

(57) ABSTRACT

In one aspect of the invention, methods of synthesizing iron phosphate precursors and lithium iron phosphate active material usable for a lithium secondary battery include the steps of first forming fine particle iron phosphate precursors hydrated and anhydrous, then forming electrode active material lithium iron phosphate with said iron phosphate precursors. The unique methods are generally efficient and cost effective, as well as stable and scalable for a high performance electrode active material with high capacity, good discharge profile, high electronic conductivity, as well as long cycle life.

17 Claims, 8 Drawing Sheets

HIGH PERFORMANCE CATHODE MATERIAL LIFEPO4, ITS PRECURSORS AND METHODS OF MAKING THEREOF

PRIORITY CLAIMS AND RELATED APPLICATIONS

This application claims the benefit of U.S. Provisional Application No. 61/309,472, filed Mar. 2, 2010, entitled "Nano-sized iron phosphates preparation and their application in producing electrochemically active materials LiFePO$_4$ used in high energy and high power storage applications" by Guiqing Huang. This application is herein expressly incorporated by reference in its entirety.

FIELD OF THE INVENTION

The invention generally relates to the preparation of materials useful as electrochemically active materials in lithium secondary batteries. More specifically, the invention relates to methods for preparing iron phosphate precursors and their application in production electrochemically active electrode materials useful for batteries, in particular for lithium iron phosphate (LiFePO$_4$) secondary batteries.

BACKGROUND OF THE INVENTION

Since the ordered olivine lithium iron phosphate (LiFePO$_4$) was discovered by Goodenough et al [1], it has been extensively and intensively studied as a cathode material for lithium ion battery due to its advantages include a high theoretical specific capacity (170 mAh/g), long cycle ability, high safety, low toxicity and potential for low cost [1,2], and much efforts have been made to understand and improve the performance of LiFePO$_4$ in the past decade. Recently, Olivine LiFePO$_4$ has been considered as the most promising cathode candidate for the next generation large-scale lithium ion battery used for hybrid electric vehicles (HEVs), electric vehicles (EVs) and large-scale energy storage systems for the sustainable energy needed for a low carbon society, such as the wind and solar power [3].

It is well-known in the lithium ion battery community that the slow diffusion of lithium ion and/or the low electronic conductivity in LiFePO$_4$ limits its application as the power supply [2,5]. This apparent drawback had been compensated greatly in recent years through various materials synthesis and/or processing approaches, including the use of carbon coatings [6,7], particle size minimization [2, 8-13] and multivalent metal ions doping [14-16] and so on.

Recently, synthesized methods of LiFePO$_4$ which take full considerations of carbon coating, particle size minimization and/or metal ions doping are gained more and more attention for improving the performances of cathode materials in terms of energy density, power density (rate capability), cycle life (stability). Nanosize carbon coated LiFePO$_4$ cathode materials display very excellent electrochemistry properties. Kang and Ceder [17] obtained LiFePO$_4$/C material with the size of about 50 nm by solid-state reaction and it showed good high-rate discharge performances, about 140 mAh/g at 20 C rate. Various methods have also been reported to prepare nanosize LiFePO$_4$ particles with micron/nanostructures, which are highly desired for designing high-performance lithium-ion batteries with high volumetric energy density and good rate capability [18-21]. These structured LiFePO$_4$/C particles create 3D electronic and ionic pathways, which facilitate electron migration in the solid phase and lithium ion diffusion in the liquid phase and provide the material excellent cyclability and superior rate capability. These micron/submicron-sized LiFePO$_4$ well-structured particles have a high tap density and, as electrodes, show excellent rate capability and cycle stability.

There is an urgent need for novel technologies that find cost-effective synthesis methods to produce micron/submicron-sized nanostructured LiFePO$_4$ particles, which have a high capacity and, as electrodes, show excellent high rate capability, retention and cycle stability.

SUMMARY OF THE INVENTION

In the present invention, the inventor found that lithium iron phosphate active materials (LFP) and their power performance at very high discharge rate can be achieved by using fine particle size iron phosphate (FP) as precursor. Since up to 95% weight of lithium iron phosphate is iron phosphate, starting with fine particle size iron phosphate precursor to produce good quality lithium iron phosphate is advantageous. By using FP as precursor, ones can product LFP active materials with enhanced electrochemical properties more efficiently and effectively. For example, FP precursor materials with fine particle sizes can be obtained according to the present invention. FP precursor comprises a micron-size composite that is packed with a plurality of fine particles iron phosphate. Such fine particle (e.g., submicron nanometer-size particle) precursors enable the preparation of electrochemically active materials with smaller particle (e.g. nanometer size) and with excellent high-drain properties. The methods of the invention are generally efficient and cost effective, as well as stable and scalable.

In "micron particle" or "submicron nanometer particle" or "nanometer particle", "particle" means an elementary particle or a secondary particle or a thirdly particle. An elementary particle comprises a single crystallite. A secondary particle is an agglomerate containing several crystallites, a thirdly particle is a agglomerate containing plurality secondary particles.

In one aspect, the invention generally relates to methods for preparing iron phosphate precursors and their application in producing electrode active materials useful for lithium secondary battery.

In one embodiment the method includes the step of providing a first solution and a second solution, where the first solution comprises iron source compound mixed in water, the second solution comprises phosphate source compound mixed in water.

In one embodiment the method includes the step of providing a first solution and a second solution to make ferric phosphate, where the first solution comprises ferric and/or ferrous source compound mixed in water, the second solution comprises phosphate source compound mixed in water, oxidation the ferrous to ferric with oxidized agents $H_2O_2$, $Na_2O_2$, $NaClO_3$ or a mixtures thereof.

In one embodiment the method includes the step of providing a first solution and a second solution to make ferrous phosphate or ferrous ammonium phosphate, where the first solution comprises ferrous source compound mixed in water and the second solution comprises phosphate source compound mixed in water.

Further, the method includes steps of adding the second solution into the first solution with stirring in pre-determined molar ratios to form a first mixture, stirring the first mixture for a first period of time and adjust pH between about 1 to about 6.5 with NaOH, $NH_4OH$, $NH_4HCO_3$ solution, or mixtures thereof to form the second mixture.

In addition, the method includes the steps of heating the second mixture to the first temperature for the second period of time to form the third mixture.

Furthermore, the method includes steps of separating the solid substance from the third mixture, rinsing it with water, and drying it by heating at the second temperature for the third period of time to obtain the first fine particle size iron phosphate precursor material (FP1 hydrated).

In one embodiment, the FP1 hydrated is ferric phosphate hydrate, or ferrous ammonium phosphate hydrate, or ferrous phosphate hydrate.

In one embodiment, heating the FP1 at the third temperature for the fourth period of time to form the second fine particle size iron phosphate precursor material (FP2 anhydrous). FP2 anhydrous is ferric phosphate anhydrous, or ferrous ammonium phosphate anhydrous or ferrous phosphate anhydrous.

Moreover, the method includes the steps of mixing pre-determined molar ratios of a lithium source compound and FP precursor in water or organic solvent in the present of carbon source compound to form a lithium iron phosphate precursor, sintering the lithium iron phosphate precursor in an inert atmosphere to form a lithium iron phosphate active material.

In one embodiment, the lithium source compound is selected from Li—COOH, (lithium formate), $Li_2O$, lithium oxalate, $Li_2CO_3$, LiOH, $CH_3COOLi$, LiF, LiI or mixtures thereof. The lithium iron phosphate precursor is formed with Li:Fe:P=1:1:1 by mole ratio. The inert atmosphere is an essentially non-oxidizing atmosphere achieved through the use of vacuum, or through the use of inert gases such as argon, nitrogen, and/or reduction atmosphere comprises hydrogen gas mixture.

In one embodiment, the first temperature, the second temperature and the third temperature are respectively in ranges of about 25-100° C., 60-105° C., and about 250-600° C. The first period of time, the second period of time, the third period of time, the fourth period of time and the fifth period of time are respectively in ranges of about 2-5 hours, about 1-10 hours, about 2-12 hours, and about 2-20 hours.

In one embodiment, the iron phosphate precursors FP precursor hydrate and anhydrate comprise a micron-size composite that is packed with a plurality of submicron nanometer-size iron phosphate particles and have a tap density that is in a range of about 0.5 to 3 $g/cm^3$.

In one embodiment, the submicron nanometer-size FP precursor has a size in a range of preferably about 100-800 nm, more preferably 100-500 nm. The micron-size iron phosphate has a size in a range of preferably about 1-100 μm.

In another aspect, the present invention relates to a method of synthesizing a lithium iron phosphate active material usable for a lithium secondary battery. In one embodiment, the method includes the steps of forming a fine particle iron phosphate precursor (FP), mixing pre-determined molar ratios of a lithium source compound and FP precursor in water or/and organic solvent in the present of carbon source compound, at a temperature between about room temperature to less than or equal to the boiling point, for about 2 to about 8 hours to form the first nanometer-size lithium iron phosphate precursor (LFP1);

In one embodiment, sintering the LFP1 in an inert atmosphere at about 300° C. to about 450° C. for about 2 to about 10 hours to form the second nanometer-size lithium iron phosphate precursor (LFP2).

In one embodiment, sintering the LFP1 or/and LFP2 in an inert atmosphere first at about 300° C. to about 400° C. for about 2 to about 5 hours then at about 500° C. to about 900° C. for about 2 to about 15 hours, thereby obtaining a nanometer-size electrochemically active material lithium iron phosphate LFP.

The LFP1, LFP2, and LFP composite comprise primary nanoparticles to form the secondly submicron nanoparticles, the secondly submicron nanoparticles to form the thirdly micron-size particles.

In one embodiment, the nanometer-size LFP1, LFP2, and LFP have a primary particle size in a range of about 10-300 nm, the secondly submicron particle size in a range of about 50-900 nm, and the thirdly micron-size particle size in a range of about 1-100 μm.

In a further aspect, the present invention relates to the preparation of iron phosphate precursor and its application in lithium iron phosphate synthesized according to the methods disclosed above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

The present invention will now be described more fully hereinafter with reference to the accompanying drawings, in which exemplary embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. The use of examples anywhere in this specification, including examples of any terms discussed herein, is illustrative only, and in no way limits the scope and meaning of the invention or of any exemplified term. Likewise, the invention is not limited to various embodiments given in this specification As used herein, "about", "approximately" or "around" shall generally mean within 20 percent, preferably within 10 percent, and more preferably within 5 percent of a given value or range. Numerical quantities given herein are approximate, meaning that the term "about", "approximately" or "around" can be inferred if not expressly stated.

As used herein, terms "submicron nanometer", "nanometer-size", "nanometer", the "nano-" prefix, and the like generally refers to elements or articles having widths or diameters of less than about 1 μm. In all embodiments, particles are made of primary particles each consisting of a single crystallite, or of secondary particles each consisting of a plurality crystallites and behaving as a single crystallite, or of thirdly particles each consisting of a plurality secondary particles. For example, FP precursor comprises a micron-size particle that is packed with a plurality of fine particles iron phosphate, such fine particle has submicron nanometer-size; LFP comprises a micron-size particle that is packed with a plurality of lithium iron phosphate submicron nanometer particles, and the submicron nanometer is packed with a plurality of lithium iron phosphate nanometer-size particles.

As used herein, "inert atmosphere", or "reducing atmosphere" is an essentially non-oxidizing atmosphere achieved through the use of vacuum, or through the use of inert gases such as argon, nitrogen, and/or reduction atmosphere comprises an argon and hydrogen gas.

As used herein, "FP" refers to iron phosphate precursor, "FP1" refers to iron phosphate precursor hydrated, "FP2" refers to iron phosphate precursor anhydrous, "LFP1" refers to the first lithium iron phosphate precursor composite, "LFP2" refers to the second lithium iron phosphate precursor composite, "LFP" refers to electrode active material lithium iron phosphate.

Overview Of The Invention

Three fundamental requirements for a high performance cathode of lithium ion batteries are: high capacity, good discharge profile, high electronic conductivity, as well as long cycle life. The intrinsic conductivity of lithium iron phosphate is very low, and therefore, various approaches have been exercised to improve the conductivity of lithium iron phosphate. Adding carbon into the system has been the most dominant approach among all conventional methods. The lithium ion diffusion rate in the lithium iron phosphate solid phase is also low, and reducing dimension of lithium iron phosphate particles is an efficient way to shorten the diffusion path and boost lithium ion transport during electrochemical cycling. Small particle size is the most important factor for LiFePO$_4$-based cathode materials to dedicate high rate capacity and high rate energy density. Gaberscek et al., Electrochemistry Comm 9 (2007)2778-2783, showed for the first time that in LiFePO$_4$-based cathode materials the electrode resistance depends solely on the mean particle size. Thus, in order to achieve a high rate capability of LiFePO$_4$ electrodes, more emphasis should be placed on the particle size minimization. Myeong-Hee Lee, et al. Chem. Comm 46 (2010) 6795-6797, showed that the nano-dimension of the primary particles of LiFePO$_4$ is the most important contribution to LiFePO$_4$ high power discharge performances.

The path of obtaining fine particles iron phosphate precursor first and then using the precursor to produce a nanometer-sized particle lithium iron phosphate active material is very advantageous. However, how to obtain fine particle iron phosphate precursor and further obtain high performance lithium iron phosphate cathode materials from the fine particle precursor have been surprisingly ignored by electrode materials suppliers and research community.

One aspect of the present invention provides methods for preparing fine particle iron phosphate precursors. In embodiments, the size range of the precursor is from about 50 to 900 nm The precursor is useful for producing lithium iron phosphate usable for electrode active material, preferably for cathode material for lithium ion secondary batteries, and/or as an ion storage devices.

Referring the following examples, in one aspect of the present invention, methods of synthesizing iron phosphate precursors usable for producing lithium iron phosphate cathode material includes the steps of providing a first solution and a second solution, in one embodiment where the first solution comprises ferric and/or ferrous source compound mixed in water, the second solution comprises phosphate source compound mixed in water, oxidation the ferrous to ferric with oxidized agents $H_2O_2$, $Na_2O_2$, $NaClO_3$ or a mixtures thereof (to obtain ferric phosphate); yet in another embodiment where the first solution comprises ferrous source compound mixed in water ((to obtain ferrous phosphate or ferrous ammonium phosphate). The second solution comprises phosphate source compound mixed in water.

Further, the method includes the steps of adding the second solution into the first solution with stirring in pre-determined molar ratios to form a first mixture, stirring the first mixture for the first period of time and adjust pH between about 1 to about 6.5 with NaOH, NH₄OH, NH₄HCO₃, or mixtures thereof to form the second mixture.

Furthermore, the method includes the steps of heating the second mixture at the first temperatures for the second period of time to form the third mixture, filtering and rinsing the third mixture with water to obtain solid substances, drying the solid substance by heating it at the second temperature for the third period of time to obtain the first fine particle iron phosphate precursor hydrated material (FP1), and heating FP1 at the third temperature for the fourth period of time to form the second fine particle iron phosphate precursor anhydrous material (FP2).

In one embodiment, the iron source compound for making ferric phosphate precursor is selected from ferric materials such as ferric hydroxide, ferric nitrate, ferric sulfate, ferric chloride, and from ferrous source material such as ferrous hydroxide, ferrous nitrate, ferrous sulfate, ferrous chloride or mixtures thereof.

In one embodiment, the iron source compound for making ferrous phosphate and ferrous ammonium phosphate precursor is selected from ferrous source material such as ferrous hydroxide, ferrous nitrate, ferrous sulfate, ferrous chloride or mixtures thereof.

In one embodiment, the phosphate source compound is selected from $H_3PO_4$, $P_2O_5$, $NH_4H_2PO_4$, $(NH_4)_2HPO_4$, $(NH_4)_3PO_4$, $NaH_2PO_4$, $Na_2HPO_4$, $Na_3PO_4$, or mixtures thereof.

In one embodiment, the pre-determined molar ratios of Fe/P is 1.0 for ferric phosphate ($FePO_4$) or ferrous ammonium phosphate ($FeNH_4PO_4$), and 1.5 for ferrous phosphate $Fe_3(PO_4)_2$.

In one embodiment, the first temperature, the second temperature and the third temperature are respectively in ranges of about 25-100° C., 60-105° C., and about 250-600° C. The first period of time, the second period of time, the third period of time, and the fourth period of time are respectively in ranges of about 2-5 hours, about 1-10 hours, 2-12 hours, and about 2-20 hours.

In one embodiment, the FP precursor composite includes a micron-size composite that is packed with a plurality of submicron nanometer-sized iron phosphate particles. The precursors have a tap density that is in a range of about 0.5 to 3.0 g/cm³.

In addition, the method includes the step of forming lithium iron phosphate cathode material usable for lithium secondary batteries from the FP precursors.

In another aspect of the present invention, a method of synthesizing a lithium iron phosphate material usable for a lithium secondary battery includes the steps of mixing a lithium source compound and FP precursor in water or/and organic solvent in the present of carbon source, at a temperature between about room temperature to less than or equal to the boiling point at atmospheric pressure for about 2 to about 8 hours to form the first nanometer-size lithium iron phosphate precursor (LFP1); sintering the LFP1 in an inert atmosphere at about 300° C. to about 450° C. for about 2 to about 10 hours to form the second nanometer-size lithium iron phosphate precursor (LFP2); sintering the LFP1 or LFP2 in an inert atmosphere first at about 300° C. to about 400° C. for about 2 to about 5 hours then at about 500° C. to about 900° C. for about 2 to about 15 hours, thereby obtaining a nanometer-sized electrochemically active material LFP.

In one embodiment, the lithium source compound is selected from Li—COOH (lithium formate), $Li_2O$, lithium oxalate, $Li_2CO_3$, LiOH, $CH_3COOLi$, LiF, LiI or mixtures thereof, the FP precursor is selected from FP1 such as $FePO_4 \cdot 2H_2O$, $FePO_4 \cdot 4H_2O$, $Fe_3(PO_4)_2 \cdot 8H_2O$, $FeNH_4PO_4 \cdot H_2O$, or from FP2 such as $FePO_4$, $FeNH_4PO_4$, $Fe_3(PO_4)_2$, or mixtures thereof.

In one embodiment, the lithium iron phosphate precursor is formed with Li:Fe:P=1:1:1 by mole ratio.

In one embodiment, the inert atmosphere is an essentially non-oxidizing atmosphere achieved through the use of vacuum, or through the use of inert gases such as argon, nitrogen, and/or reduction atmosphere comprises an argon and hydrogen gas mixture.

In one embodiment, the carbon source is selected from an inorganic carbon-containing material, an organic carbon-containing material, a carbon-containing material, an organic carbon-containing material, a polymeric carbon-containing material, or a natural product carbon source, or a mixtures thereof. The weight ratio of the carbon source material:the iron source material is from 1 to about 45 g per molar.

In one embodiment the solvent is selected from water and organic solvent such as ethanol, acetone, ethylene glycol, isopropanol, acetonitrile, DMF (Dimethylformamide), DMSO (Dimethyl sulfoxide) or mixtures thereof.

Figure 1:
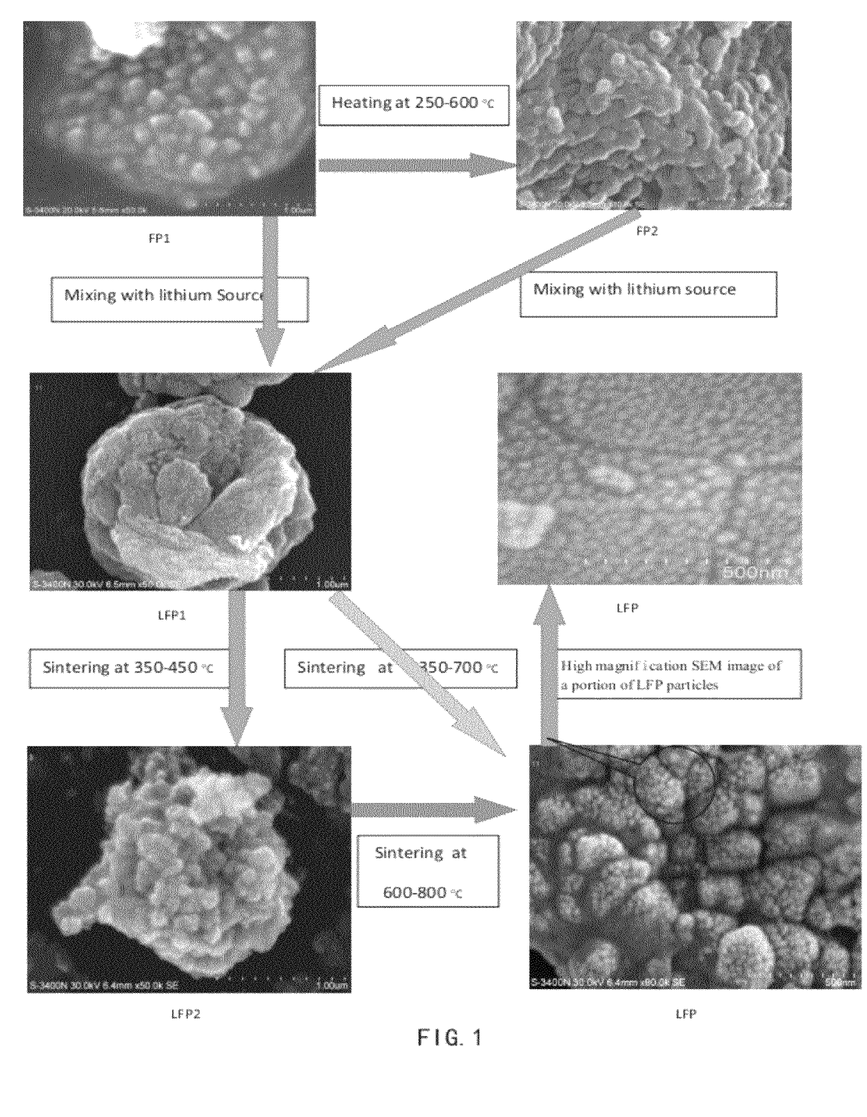
FIG. 1 shows a schematic illustration of from a submicron nanometer-size iron phosphate precursor FP1 or FP2, to synthesize nanometer-size lithium iron phosphate precursor composite LFP1, LFP2 and active material lithium iron phosphate $LiFePO_4$ according to one embodiment of the present invention.

Referring to FIG. 1, in one aspect of the present invention, a method of synthesizing a lithium iron phosphate material LFP includes the steps: starting from a fine particles(e.g. submicron nanometer-size particles) iron phosphate precursor FP1 or FP2 which having micron-size composite that is packed with a plurality of submicron nanometer-sized iron phosphate particles; mixing the fine particle size FP1 or FP2 with lithium source compound to form the first lithium iron phosphate precursor LFP1 which comprises a micron-size particle that is packed with a plurality of lithium iron phosphate submicron nanometer-size particles, and the submicron nanometer-size particle is packed with a plurality of lithium iron phosphate nanometer-size particles; sintering the micron-size particles LFP1 under an inert and/or reduction atmosphere to form the second lithium iron phosphate precursor LFP2 which comprises the same or about the same particles of LFP1; sintering LFP1 and/or LFP2 under an inert and/or reduction atmosphere to form active material lithium iron phosphate LFP which comprises the same or about the same particles of LFP1 and LFP2.

The inert atmosphere is an essentially non-oxidizing atmosphere achieved through the use of vacuum, or through the use of inert gases such as argon, nitrogen, and/or reduction atmosphere comprises an argon and hydrogen gas mixture.

Referring to FIGS. 4A, 4B, 5A, & 5B, in one aspect of the present invention, a method of synthesizing a iron phosphate precursor FP1 and FP2 comprise a micron-size composite that is packed with a plurality of submicron nanometer-sized iron phosphate particles. The FP micron-size has a size in a range of about 1-100 μm, the submicron nanometer-size particles has a size in a range of about 100-800 nm.

Figure 9A:
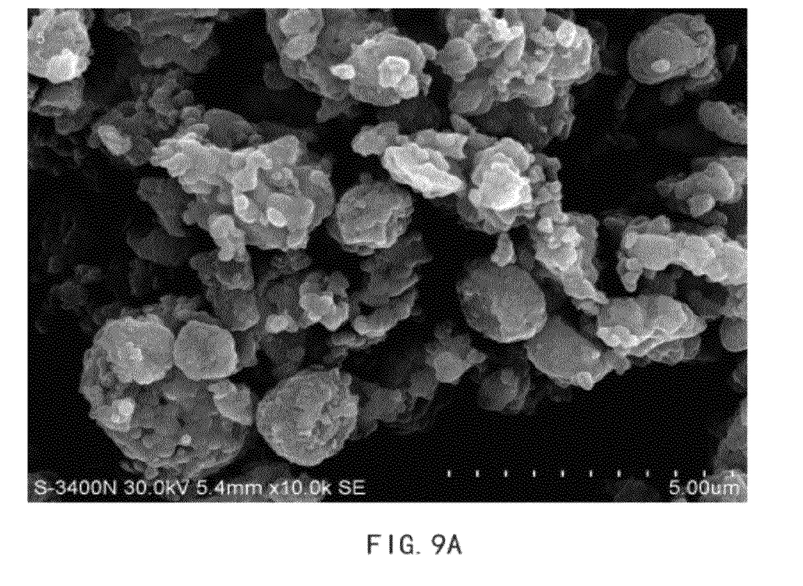
FIGS. 9A, 9B & 9C show scanning electron microscope (SEM) images of a nanometer-size lithium iron phosphate active material LiFePO$_4$ with different magnification produced according to one embodiment of the present invention. The images show well dispersed and uniform about 20-70 nm primary particles packing to form submicron nanometer particle, the submicron nanometer particles packing to form micron-size particle LFP.
Figure 9B:
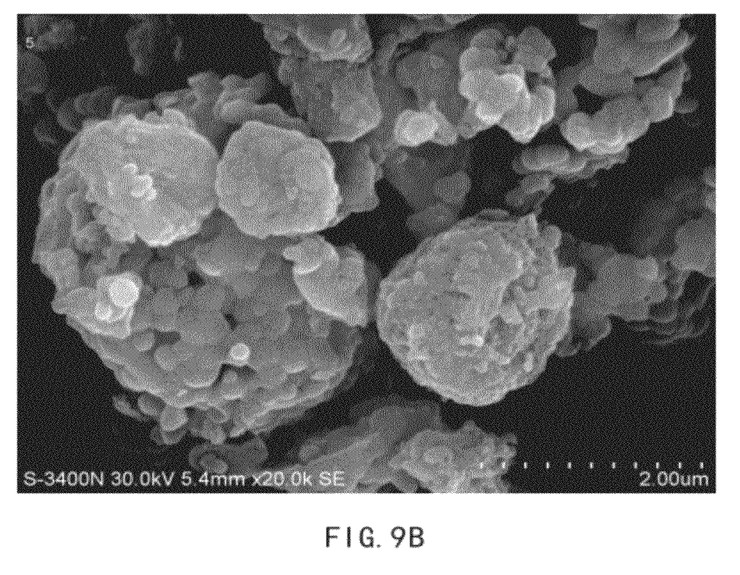
Figure 9C:
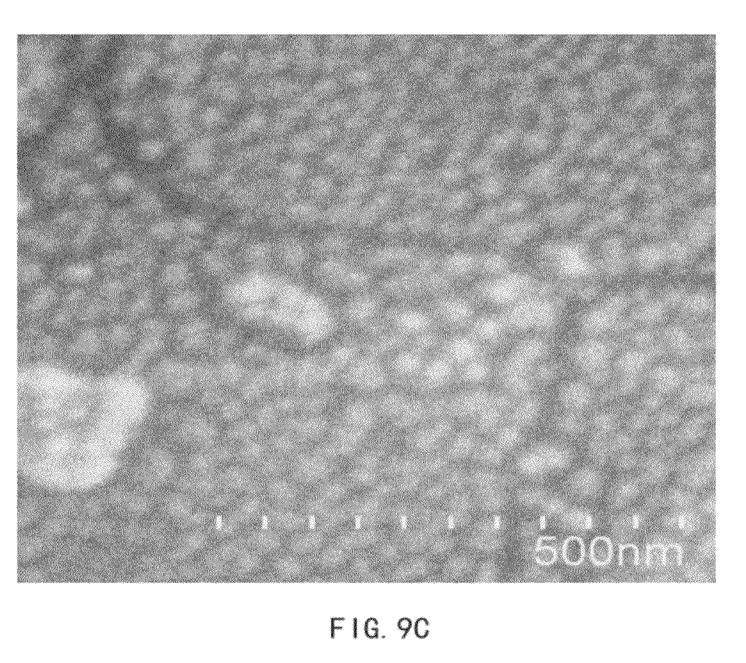

Referring to FIGS. 9A, 9B, & 9C, in one aspect of the present invention, a method of synthesized electrode active material lithium iron phosphate LFP comprises a micron-size composite that is packed with a plurality of submicron nanometer-size lithium iron phosphate particles. The submicron nanometer-size particle is packed with a plurality of nanometer-size lithium iron phosphate particles. The micron-size LFP particle has a size in a range of about 1-100 μm. The submicron nanometer-size LFP particle has a size in a range of about 100-800 nm The nanometer-sized LFP particle has a size in a range of about 10-300 nm.

FP1 and FP2 fine particle has a size that is less than about 1.0 μm where the median size is less than about 1.0 μm, and the standard deviation is no more than 50% of the median size. For example, the size distribution of the iron phosphate precursor particles is less than about 1.0 μm±500 nm, or less than about 0.8 μm±400 nm, or less than about 0.5 μm±250 nm, or less than about 0.3 μm±150 nm, or less than about 0.1 μm±50 nm, or lest than about 80 nm±40 nm, or less than about 60 nm±30 nm, or less than about 40 nm±20 nm, or less than about 20 nm±10 nm.

LFP1, LFP2 and LFP nanoparticle has size that is less than about 300 nm, where the median size is less than about 300 nm, the standard deviation is no more than 50% of the median size. For example, the size distribution of the nanoparticles is less than about 300 nm±150 nm, or less than about 250 nm±125 nm, or less than about 200 nm±100 nm, or less than about 150 nm±75 nm or lest than about 100 nm±50 nm, or less than about 70 nm±35 nm, or less than about 40 nm±20 nm, or less than about 30 nm±15 nm, or less than about 20 nm±10 nm, or less than about 10 nm±5 nm.

LFP1, LFP2 and LFP submicron nanometer particle has a size that is less than about 1.0 μm where the median size is less than about 1.0 μm, and the standard deviation is no more than 50% of the median size. For example, the size distribution of the particle is less than about 1.0 μm±500 nm, or less than about 0.8 μm±400 nm, or less than about 0.5 μm±250 nm, or less than about 0.3 μm±150 nm, or less than about 0.1 μm±50 nm, or less than about 80 nm±40 nm, or less than about 60 nm±30 nm, or less than about 40 nm±20 nm, or less than about 20 nm±10 nm.

The micron-size FP1, FP2, LFP1, LFP2, and LFP have a size in a range of about 1-100 μm where the median size is a range of about 1-100 μm, and the standard deviation is no more than 50% of the median size. For example, the size distribution of micron-size particle is less than about 100 μm±50 μm, or less than about 80 μm±40 μm, or less than about 60 μm±30 μm, or less than about 40 μm±20 μm, or less than about 20 μm±10 μm, or less than about 15 μm±7.5 μm, or less than about 10 μm±5 μm, or less than about 8 μm±4 μm, or less than about 6 μm±3 μm, or less than about 3 μm±1.5 μm, or less than about 2 μm±1 μm, or less than about 1 μm±500 nm.

Clearly, it is advantageous to use fine particles iron phosphate precursor to product lithium iron phosphate active material.

The present invention provides methods for producing precursors and electrochemically active materials. The invention therefore provides effective improvements of electrochemical properties and methods of preparation that are efficient and cost-effective. Laboratory cells constructed with such cathode active material (e.g., LiFePO$_4$) exhibit greatly improved capacity and voltage plateau retention at high charge and discharge rates.

It also results in high initial discharge capacity and allows for very low cycling capacity loss and retains extremely high discharge capacity at high discharge rate.

Figure 10:
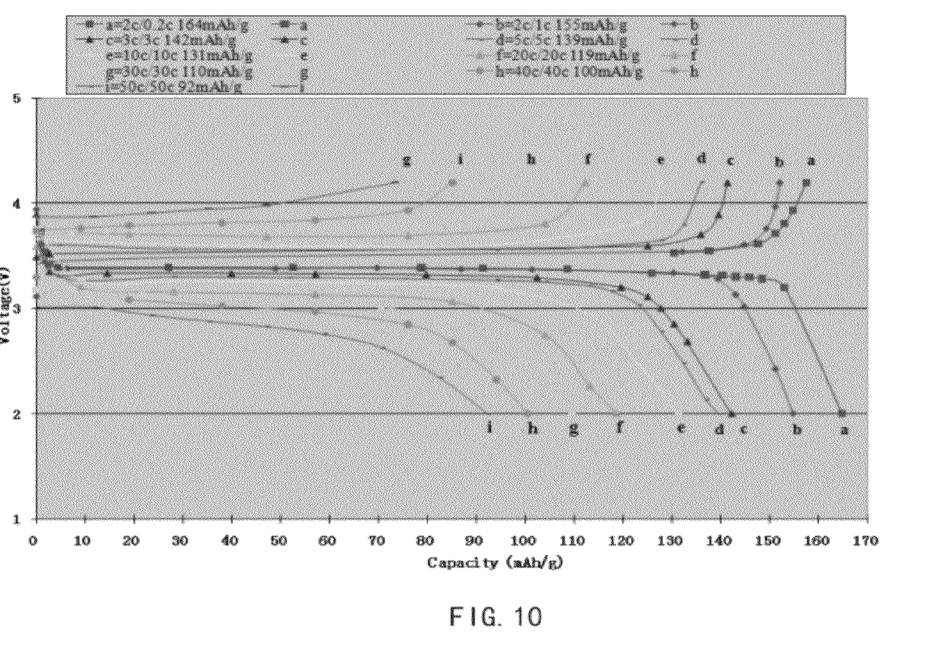
FIG. 10 shows an exemplary charge and discharge at different current rates for active material LiFePO$_4$ prepared according to the present invention. The voltage window is approximately 2.0-4.2 V. The electrode formulation is active material (85 wt %), carbon (7 wt %) and binder (8 wt %).

Referring to FIG. 10, in one aspect of the present invention, one of the cells performance test at different current rate indicated that over a voltage range of 2.0V-4.2V for charge/discharge, the discharge capacity measured at a 0.2 C rate the discharge capacity was about 164 mAh/g; At a 1 C rate the discharge capacity was about 155 mAh/g; At a 3 C rate the discharge capacity was about 142 mAh/g; At a 5 C rate the discharge capacity was about 139 mAh/g, compared to the capacity measured at a low rate of 0.2 C, the capacity retention was about 85%; At a 10 C rate the discharge capacity was about 131 mAh/g and the capacity retention about 80%; At a 20 C rate the discharge capacity was about 119 mAh/g and the capacity retention was about 73%; At a 30 C rate the discharge capacity was about 110 mAh/g and the capacity retention was about 67%; At a 40 C rate the discharge capacity was about 100 mAh/g and the capacity retention was about 61%; At a 50 C rate the discharge capacity was about 92 mAh/g and the capacity retention was about 56%.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention.

Example 1

Figure 2:
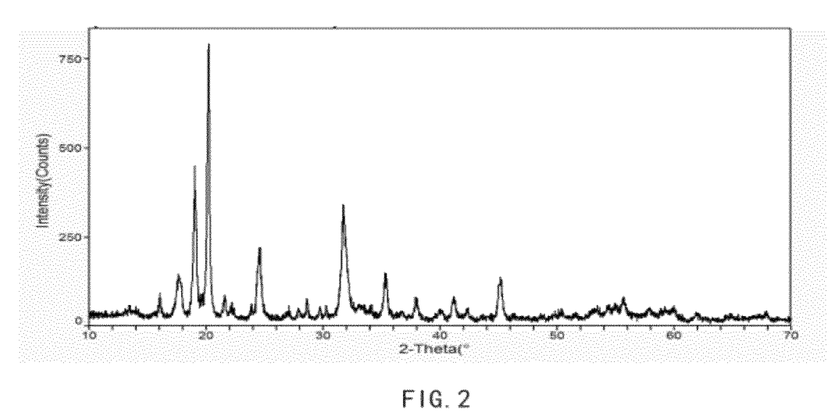
FIG. 2 shows an X-ray diffraction pattern of ferric phosphate hydrate precursor $FePO_4.2H_2O$ produced according to one embodiment of the present invention.
Figure 3:
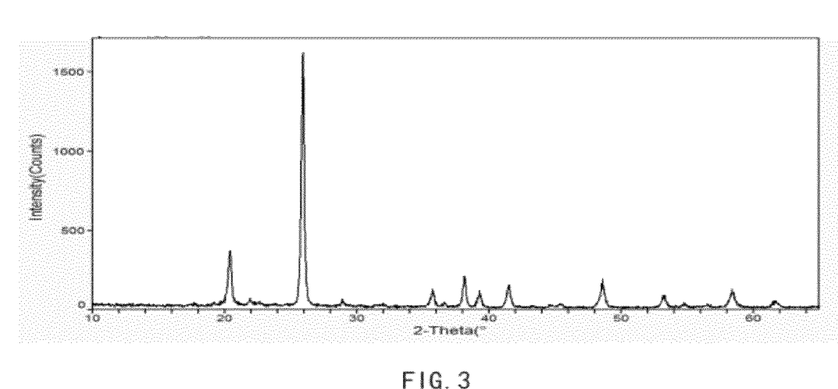
FIG. 3 shows an X-ray diffraction pattern of ferric phosphate anhydrous precursor $FePO_4$ produced according to one embodiment of the present invention.
Figure 4A:
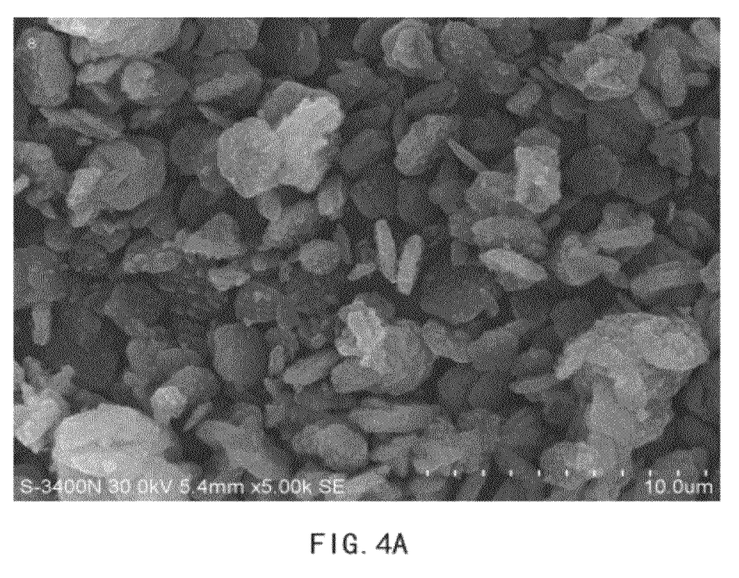
FIGS. 4A & 4B show scanning electron microscope (SEM) images of ferric phosphate hydrate precursor of $FePO_4.2H_2O$ with different magnification produced according to one embodiment of the present invention. The precursor includes fine particles size iron phosphate hydrated close packing to form micron-size particle iron phosphate hydrated.
Figure 4B:
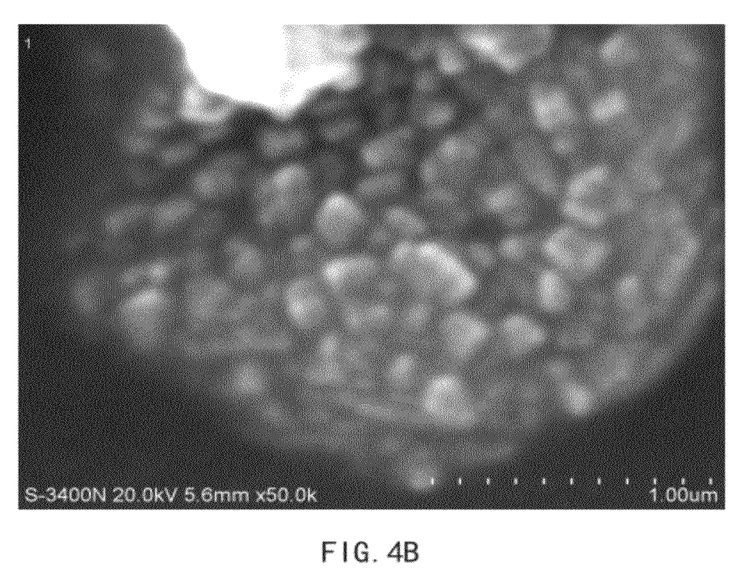
Figure 5A:
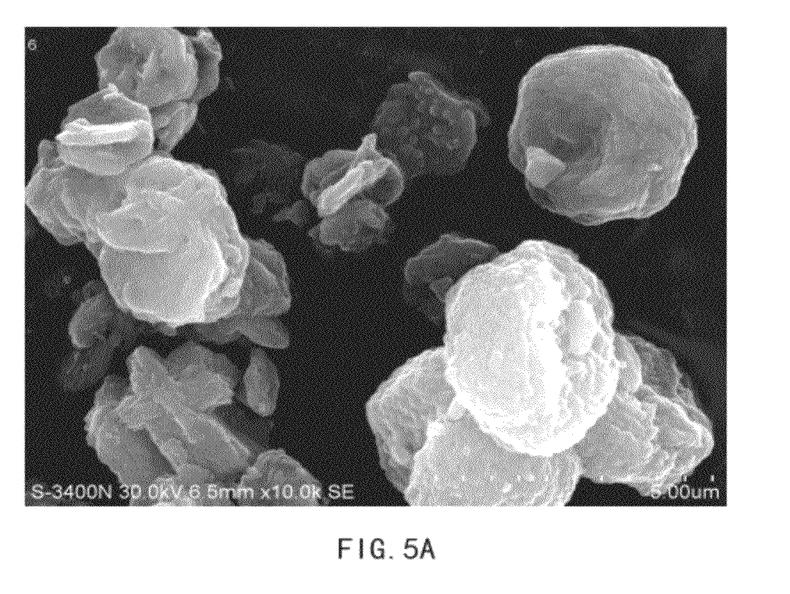
FIGS. 5A & 5B show scanning electron microscope (SEM) images of a ferric phosphate anhydrous precursor of $FePO_4$ produced according to one embodiment of the present invention. The precursor includes fine particles size iron phosphate anhydrous close packing to form micron-size particle iron phosphate anhydrous.
Figure 5B:
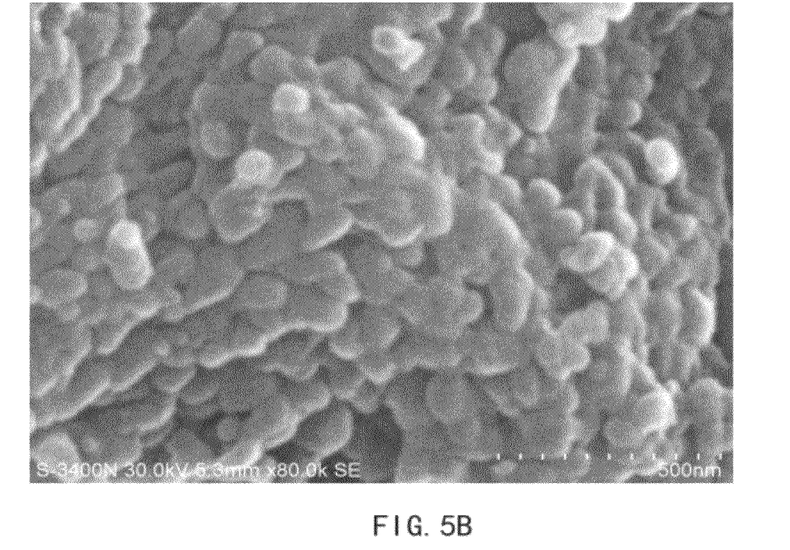

Solution A1: about 139 gram of ferrous sulfate heptahydrate was dissolved in about 500 ml of water; Solution B1: about 55.8 gram of ammonium dihydrogen phosphate was dissolved in about 400 ml of water. Solution B1 was added into Solution A1 with stirring. The 17% $H_2O_2$ solution was added to make all ferrous oxidized to ferric, adjusted pH to 2.5 with continued stirring. Suspension and precipitate were heated at 90° C. under stirring for about four hours. The resulting mixture was filtered and thoroughly rinsed with water. The resulting solid material was then dried in an oven at about 104° C. for overnight, and the dry solid material (FP1) was then heated to about 500° C. for about 5 hours to form FP2. The XRD pattern of FP1 and FP2 given in FIGS. 2 and 3 respectively, which indicate a crystalline ferric phosphate dihydrate phase and ferric phosphate anhydrous phase. FIGS. 4A, 4B, 5A, 5B show the FP1 and FP2 comprise micron-size particles packed with submicron nanometer-sized particles, The FP micron-size has a size in a range of about 1-15 μm, the submicron nanometer-size particles has a size in a range of about 100-500 nm.

Figure 8:
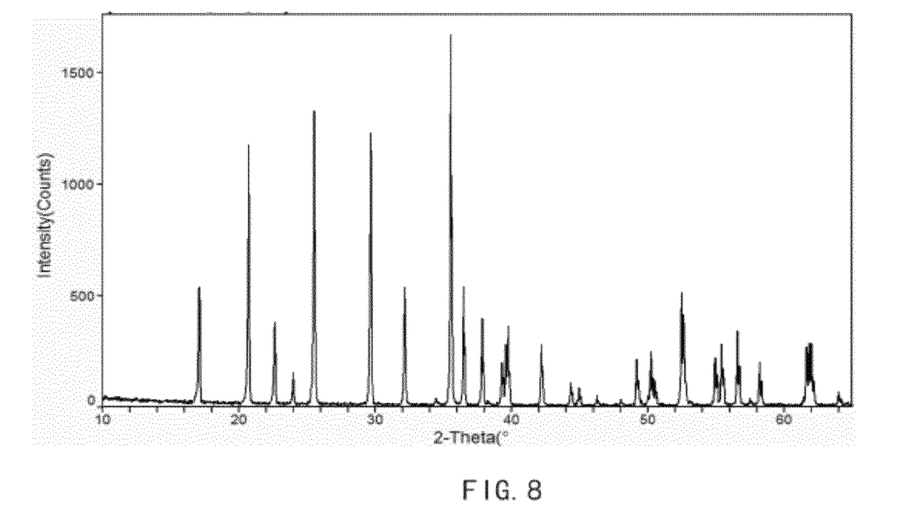
FIG. 8 shows an X-ray diffraction pattern of lithium iron phosphate active material $LiFePO_4$ produced according to one embodiment of the present invention.

The mole rate Li:Fe:P=1:1:1 of $Li_2CO_3$ and FP2 were mixed with cellulose acetate (about 15% of total solid weight per mole FP2) in isopropyl as solvent, heated the mixture at 40° C. for 4 hours to form a lithium iron phosphate precursor LFP1. The LFP1 was then sintered under argon gas at about 350° C. for about 5 hours to form LFP2, the LFP2 was then sintered under argon gas at about 700° C. for about 12 hours to form LFP. The XRD pattern of the sintered product LFP is given in FIG. 8, which indicates a highly crystalline LiFePO$_4$ phase with an olivine structure. SEM images of the sintered LiFePO$_4$ shown in FIGS. 9A, 9B, and 9C show that the sintered LiFePO$_4$ comprises a micron-size composite that is packed with a plurality of submicron nanometer-sized lithium iron phosphate particles, and the submicron nanometer-size particle is packed with a plurality of nanometer-sized lithium iron phosphate particles. The micron-size LFP particle has a size in a range of about 1-15 μm. The submicron nanometer-size LFP particle has a size in a range of about 100-500 nm. The nanometer-sized LFP particle has a size in a range of about 10-100 nm. The tap density of the sintered LiFePO$_4$ is about 0.95 g/cm$^3$. The resulting LiFePO$_4$ material was used as a cathode material to form a coin cell for an electrochemical performance test. The electrode formulation is active material (85 wt %), carbon (7 wt %) and binder (8 wt %). FIG. 10 shows an exemplary performance test of charge and discharge at different current rates. Over a voltage range of 2.0V-4.2V for charge/discharge, the discharge capacity measured at 0.2 C rate was 164 mAh/g, at 1 C rate was 155 mAh/g, at 3 C rate was 142 mAh/g, at 5 C rate was 139 mAh/g, at 10 C rate was 131 mAh/g, at 20 C rate was 119 mAh/g, at 30 C rate was 110 mAh/g, at 40 C rate was 100 mAh/g, at 50 C rate was 92 mAh/g.

Example 2

Solution A2: about 135 gram of ferric chloride hexahydrate was dissolved in about 700 ml of water; Solution B2: about 57.7 gram 85% phosphoric acid was mixed in about 200 ml of water. Solution B2 was added into Solution A2 with stirring, adjusted pH to about 2.8 with continued stirring. Follow the same steps as Example 1 to make FP1, FP2, LFP1, LFP2, and LFP. The resulting LFP material was used as a cathode material to form a coin cell for electrochemical performance test, and it gave a discharge capacity of about 158 mAh/g at 0.2 C rate.

Example 3

Solution A3: about 1.2 kg 85% phosphoric acid was mixed in about 1 liter of water, about 0.5 kg iron powder was added into Solution A3 with stirring. Continuing stirring until all the iron powder dissolved and all ferrous oxidized to ferric(by oxygen or/and $H_2O_2$). Adjusted pH to about 3.0, heated the solution at about 50° C. with continuing stirring for about four hours. The resulting mixture was filtered and thoroughly rinsed with water. The resulting solid material was then dried in an oven at about 104° C. for overnight, to obtain dry solid material FP1.

The equivalent mole of a lithium compound, $LiOH.H_2O$ and FP1 were mixed with cellulose acetate (about 30% of total solid weight per mole FP2) in water at room temperature to form a lithium iron phosphate precursor LFP1 (with Li:Fe:P=1:1:1). The LFP1 was then sintered under argon gas at about 350° C. for about 5 hours then at about 700° C. for about 12 hours to form LFP. The XRD pattern of the sintered product LFP is as same as the one shown in FIG. 8, which indicates a highly crystalline $LiFePO_4$ phase with an olivine structure. SEM images of the sintered $LiFePO_4$ shown similar result of FIGS. 9A, 9B, and 9C. The tap density of the sintered $LiFePO_4$ is about 0.98 g/cm$^3$. The resulting $LiFePO_4$ material was used as a cathode material to form a coin cell for electrochemical performance test, and the result indicated a discharge capacity of about 155 mAh/g at 0.2 C rate.

Example 4

Figure 6:
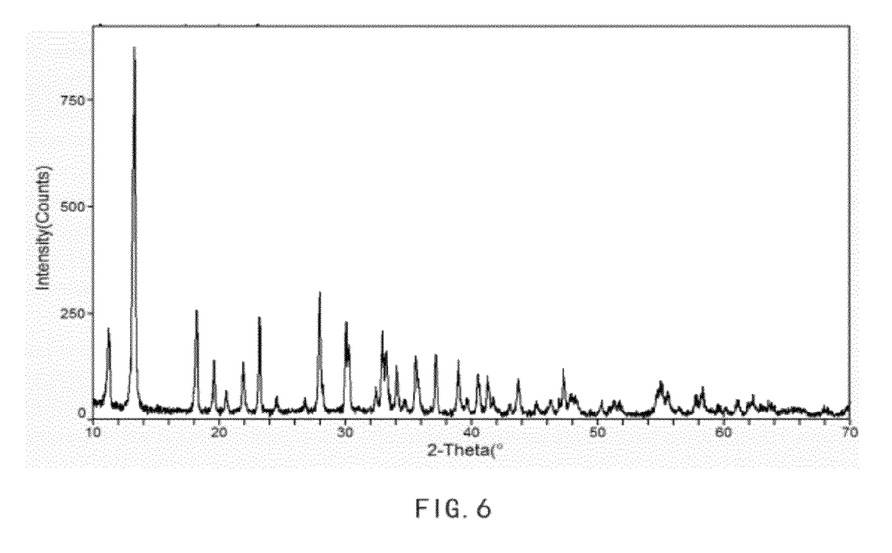
FIG. 6 shows an X-ray diffraction pattern of ferrous phosphate hydrated precursor $Fe_3(PO_4)_2.8H_2O$ produced according to one embodiment of the present invention.

Solution A4: about 139 gram of ferrous sulfate heptahydrate was dissolved in about 700 ml of water; Solution B4: about 55.8 gram of ammonium dihydrogen phosphate was dissolved in about 500 ml of water. Solution B4 was added into Solution A4 with stirring. Adjusted pH to 4.5 with continued stirring for about four hours. The resulting mixture was filtered and thoroughly rinsed with water. The resulting solid material was then dried in an oven at about 70° C. for overnight, to obtain dry solid material FP1. The XRD pattern of FP1 given in FIG. 6 which indicate a crystalline ferrous phosphate octohydrated phase $Fe_3(PO_4)_2.8H_2O$.

The mole rate Li:Fe:P=1:1:1 of $LiOH\ H_2O$, the FP1 and $NH_4H_2PO_4$ were mixed with cellulose acetate (about 20% of total solid weight per mole FP1) in water at room temperature to form a lithium iron phosphate precursor LFP1. The LFP1 was then sintered under argon gas at about 350° C. for about 5 hours then at about 650° C. for about 12 hours to form LFP. The XRD pattern of the sintered product LFP is as the one shown in FIG. 8, which indicates a highly crystalline $LiFePO_4$ phase with an olivine structure. SEM images of the sintered $LiFePO_4$ shown similar result of FIGS. 9A, 9B, and 9C. The tap density of the sintered $LiFePO_4$ is about 1.25 g/cm$^3$. The resulting $LiFePO_4$ material was used as a cathode material to form a coin cell for electrochemical performance test, and the result indicated a discharge capacity of about 145 mAh/g at 0.2 C rate.

Example 5

Figure 7:
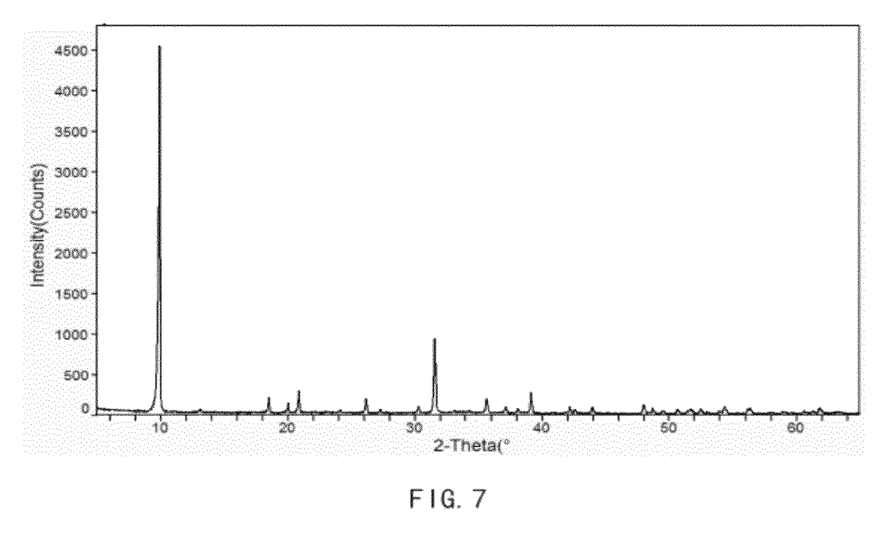
FIG. 7 shows an X-ray diffraction pattern of ferrous ammonium phosphate hydrate precursor $FeNH_4PO_4.H_2O$ produced according to one embodiment of the present invention.

Solution A5: about 139 gram of ferrous sulfate heptahydrate was dissolved in about 500 ml of water; Solution B5: 47.5 gram of ammonium dihydrogen phosphate was dissolved in about 500 ml of water. Solution B5 was added into solution A5 with stirring. Adjusted pH to 6.0 with $NH_3H_2O$ solution, heated the solution at 60° C. with continued stirring for about four hours. The resulting mixture was filtered and thoroughly rinsed with water. The resulting solid material was then dried in an oven at about 80° C. for overnight, to obtain dried solid material ferrous ammonium phosphate. The XRD pattern is as same as FIG. 7, which indicates a crystalline ferrous ammonium phosphate $FeNH_4PO_4.H_2O$ phase.

The mole rate of Li:Fe:P=1:1:1 of $Li_2CO_3$ and $FeNH_4PO_4.H_2O$ were mixed with cellulose acetate (about 10% of total solid weight per mole FP) in water at room temperature to form a lithium iron phosphate precursor LFP1. The LFP1 was then sintered under argon gas at about 350° C. for about 5 hours then at about 700° C. for about 8 hours to form LFP. The XRD pattern of the sintered product LFP is as same as the one shown in FIG. 8, which indicates a highly crystalline $LiFePO_4$ phase with an olivine structure. SEM images of the sintered $LiFePO_4$ shown similar result of FIGS. 9A, 9B, and 9C. The tap density of the sintered $LiFePO_4$ is about 1.08 g/cm$^3$. The resulting $LiFePO_4$ material was used as a cathode material to form a coin cell for electrochemical performance test, and the result indicated a discharge capacity of about 148 mAh/g at 0.2 C rate.

Briefly, the present invention, among other things, discloses methods of synthesizing FP precursor materials with fine particle size then synthesizing nanometer size active material LFP, an electrode composite useful for lithium secondary batteries. It is advantageous to use fine particle size iron phosphate precursor to synthesize electrode active material lithium iron phosphate with high performance profile.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention.

REFERENCE LIST

[1] A. K Padh, K. S Nanjundaswamy, J. B. Goodenough, "Phospho-olivines as positive-electrode materials for rechargeable lithium batteries", J. Electrochem. Soc, 1997, 144(4): 1188-1194

[2] J.-M. Tarascon, M. Armand, "Issues and challenges facing rechargeable lithium batteries", Nature, 2001, 414, 359-496.

[3] M. Armand and J.-M. Tarascon, "Building better batteries", Nature, 2008, 451, 652-657.

[4] A. K. Padhi, K. S. Nanjundaswamy, C. Masquelier, S. Okada, J. B. Goodenough, "Effect of structure on the $Fe_3^+$/$Fe_2^+$ redox couple in iron phosphates", J. Electrochem. Soc., 1997, 144, 1609.

[5] H. Huang, S.-C. Yin and L. F. Nazar, "Approaching theoretical capacity of a $LiFePO_4$ at room temperature at high rates", Electrochem. Sol. St. Lett., 2001, 4(10), A170-A172

[6] A. Yamada, S.C. Chung, K. Hinokuma, "Optimized $LiFePO_4$ for Lithium Battery Cathodes" J. Electrochem. Soc., 2001, 148, A224.

[7] N. Ravet, Y. Chouinard, J. F. Magnan, S. Besner, M. Gauthier and M. Armand, "Electroactivity of natural and synthetic triphylite", J. Power Sources, 2001, 503, 97-98.

[8] Z. H. Chen, J. R. Dahn, "Reducing Carbon in $LiFePO_4$/C Composite Electrodes to Maximize Specific Energy, Volumetric Energy, and Tap Density", J. Electrochem. Soc., 2002, 149, A1184.

[9] P. S. Herle, B. Ellis, N. Coombs, L. F. Nazar, "Nanonetwork electronic conduction in iron and nickel olivine phosphates", Nat. Mater., 2004, 3, 147.

[10] K. S. Park, K. T. Kang, S. B. Lee, G. Y. Kim, Y. J. Park, H. G. Kim, "Synthesis of $LiFePO_4$ with fine particle by co-precipitation method", Mater. Res. Bull., 2004, 39, 1803-1810.

[11] C. R. Sides, F. Croce, V. Y. Young, C. R. Martin, B. Scrosati, "A High-Rate, Nanocomposite $LiFePO_4$/Carbon Cathode", Electrochem. Solid-State Lett., 2000, 58, A484-A487.

[12] C. Delacourt, P. Poizot, S. Levasseur, C. Masquelier, "Size Effects on Carbon-Free $LiFePO_4$ Powders", Electrochem. Solid-State Lett., 2006, 9. A352-A 355.

[13] D.-H. Kim, J. Kim, "Synthesis of $LiFePO_4$ nanoparticles in polyol medium and their electrochemical properties", Electrochem. Solid-State Lett., 2006, 9, A439-A442.

[14] S. Y. Chung, J. T. Bloking and Y. M. Chiang, "Electronically conductive phospho-olivinnes as lithium storage electrodes", Nat. Mater., 2002, 1, 123.

[15] H. Liu, Q. Cao, L. J. Fu, C. Li, Y. P. Wu, H. Q. Wu, "Doping effects of zinc on $LiFePO_4$ cathode material for lithium ion batteries", Electrochem. Commun., 2006, 8, 1553-1557.

[16] J. Hong, C. S. Wang, X. Chen, S. Upreti and M. S. Whittingham, "Vanadium modified $LiFePO_4$ cathode for Li-Ion Batteries". Electrochem. Solid-State Lett., 2009, 12, A33-A38.

[17] B. Kang, G. Cederl, "Battery materials for ultrafast charging and discharging", Nature, 2009, 458, 190.

[18,] C. Sun, S. Rajasekhara, J. Goodenough and F. Zhou, "Monodisperse Porous $LiFePO_4$ Microspheres for a High Power Li-Ion Battery Cathode", J. Am. Chem. Soc., 2011, 133, 2132-2135

The invention claimed is:

1. A method for synthesizing fine particle iron phosphate precursors (FP) and their application in producing electrochemically active material lithium iron phosphate (LFP), comprising the steps of:
   (a) preparing a first solution and a second solution, wherein the first solution comprises an iron source compound mixed in water, and wherein the second solution comprises a phosphate source compound mixed in water;
   (b) adding the second solution into the first solution with stirring in a pre-determined molar ratio to form a first mixture, wherein the pre-determined molar ratio is a molar ratio of ferric or ferrous to phosphate in the first mixture;
   (c) stirring the first mixture for about 2-5 hours and adjusting pH in a range of about 1-6 to form a second mixture;
   (d) heating the second mixture at a first temperature in a range of about 25-100° C. for about 1-10 hours to obtain a third mixture;
   (e) separating solid substance from the third mixture and rinsing it with water to obtain a solid substance;
   (f) drying the solid substance by heating it at a second temperature in a range of about 60-105° C. for about 2-12 hours to obtain a first fine particle iron phosphate hydrated precursor (FP1), wherein the FP1 has a tap density in a range of about 0.5-3 $g/cm^3$ and comprises micron-sized particles, and each of the micron-sized particles is packed with a plurality of nanometer-sized iron phosphate particles;
   (g) heating the FP1 at a third temperature in a range of about 250-600° C. for about 2-20 hours to generate a second fine particle iron phosphate anhydrous precursor (FP2), wherein the FP2 has a tap density in a range of about 0.5-3 $g/cm^3$ and comprises micron-sized particles, and each of the micron-sized particles is packed with a plurality of nanometer-sized iron phosphate particles;
   (h) mixing a lithium compound and at least one of the FP1 and the FP2 at a molar ratio in water and/or an organic solvent in the presence of a carbon source compound, at a temperature between about room temperature to less than or equal to 40° C. at atmospheric pressure for about 2-8 hours to form a first lithium iron phosphate precursor (LFP1);
   (i) sintering the LFP1 in an inert atmosphere at a temperature between about 300° C. to about 500° C. for about 2-10 hours to form a second lithium iron phosphate precursor (LFP2); and
   (j) sintering the LFP1 or the LFP2 or a mixture thereof in an inert atmosphere first at a temperature between about 300° C. to about 400° C. for about 2-5 hours and then at a temperature between about 500° C. to about 900° C. for about 2-15 hours, thereby obtaining a nanometer-sized electrochemically active material LFP.

2. The method of claim 1, wherein the lithium source material is selected from Li—COOH (Lithium formate), $Li_2O$, lithium oxalate, $Li_2CO_3$, LiOH, $CH_3COOLi$, LiF, LiI, or a mixture thereof.

3. The method of claim 1, wherein the lithium iron phosphate precursor is formed with Li:Fe:P=1:1:1 by molar ratio.

4. The method of claim 1, wherein the pH is adjusted with NaOH, $NH_4OH$, $NH_4HCO_3$, or a mixture thereof.

5. The method of claim 1, wherein the iron source compound for preparing ferric phosphate precursor is selected from a ferric material, a ferrous source material, or a mixture thereof, wherein the ferric material comprises ferric hydroxide, ferric nitrate, ferric sulfate, ferric chloride, or a mixture thereof wherein the ferrous source material comprises ferrous hydroxide, ferrous nitrate, ferrous sulfate, or a mixture thereof, and wherein when the iron source compound comprises a ferrous source material, the iron source compound further comprises an oxidizing agent to oxidize ferrous to ferric.

6. The method of claim 5, wherein the oxidizing agent is $H_2O_2$, $Na_2O_2$, $NaClO_3$ or a mixture thereof.

7. The method of claim 1, wherein the iron source compound precursor comprises a ferrous source material comprising ferrous hydroxide, ferrous nitrate, ferrous sulfate, or a mixture thereof.

8. The method of claim 1, wherein the phosphate source compound is selected from $H_3PO_4$, $P_2O_5$, $NH_4H_2PO_4$, $(NH_4)_2HPO_4$, $(NH_4)_3PO_4$, $NaH_2PO_4$, $Na_2HPO_4$, $Na_3PO_4$, or a mixture thereof.

9. The method of claim 1, wherein the pre-determined molar ratio of the ferric or ferrous to the phosphate in the first mixture is 1.0 for ferric phosphate ($FePO_4$) and ferrous ammonium phosphate ($NH_4FePO_4$), and 1.5 for ferrous phosphate $Fe_3(PO_4)_2$.

10. A method for synthesizing a nanometer-sized lithium iron phosphate active material (LFP) usable for lithium secondary battery, comprising the steps of:
   (a) mixing a lithium source compound and an iron phosphate precursor (FP) in water or/and an organic solvent in the presence of a carbon source, at a temperature between about room temperature to less than or equal to 40° C. at atmospheric pressure for about 2-8 hours to form a first nanometer-sized lithium iron phosphate precursor (LFP1);
   (b) sintering the LFP1 in an inert atmosphere at a temperature between about 300° C. to about 400° C. for about 2-10 hours to form a second nanometer-sized lithium iron phosphate precursor (LFP2); and
   (c) sintering at least one of the LFP1 precursor and the LFP2 precursor in an inert atmosphere first at a temperature between about 300° C. to about 400° C. for about 2-5 hours and then at a temperature between about 500° C. to about 900° C. for about 2-15 hours, thereby obtaining a nanometer-sized electrochemically active material LFP,
   wherein the FP comprises micron-sized particles, and each of the micron-sized particles is packed with a plurality of nanometer-sized iron phosphate particles.

11. The method of claim 10, wherein the weight ratio of the carbon source material:the iron source material is from about 1 g to about 45 g per molar.

12. The method of claim 10, wherein the carbon source is selected from an inorganic carbon-containing material, an organic carbon-containing material, a polymeric carbon-containing material, a natural product carbon source, or a mixture thereof.

13. The method of claim 10, wherein the solvent is selected from water, ethanol, acetone, ethylene glycol, isopropanol, DMF, acetonitrile, or a mixture thereof.

14. The method of claim 10, wherein the inert atmosphere is an essentially non-oxidizing atmosphere achieved through the use of vacuum, or through the use of inert gases such as argon, nitrogen, and/or reduction atmosphere comprises an argon and hydrogen gas mixture.

15. The method of claim 10, wherein the nanometer-sized active material LFP has a size in a range of about 10-300 nm and a tap density that is in a range of about 0.5-3 $g/cm^3$.

16. The method of claim 10, wherein the micron-sized particles of the FP is in a range of about 1-100and the nanometer-sized iron phosphate particles of each of the micron-sized particles of the FP is in a range of 100-800 nm.

17. The method of 10, wherein the LFP, LFP1 or LFP2 comprises micron-sized particles in a size range of about 1-100μ m, each of the micron-sized particles comprises a plurality of submicron-sized particles in a size range of 100-800 nm, and each of the submicron-sized particles is packed with a plurality of well dispersed and uniform nanometer-sized particles in a size range of 10-300 nm.

* * * * *